United States Patent [19]
Gleason et al.

[11] Patent Number: 5,525,222
[45] Date of Patent: Jun. 11, 1996

[54] WATER FILTRATION SYSTEM FOR CONTROL OF THE ZEBRA MUSSEL

[75] Inventors: Harry Gleason; Jeffery Bond, both of Romulus, N.Y.

[73] Assignee: Zebra Mussel Filter Systems, Inc., Romulus, N.Y.

[21] Appl. No.: 509,353

[22] Filed: Jul. 31, 1995

[51] Int. Cl.$^6$ .......................... B01D 35/02; B01D 35/31; B01D 35/28

[52] U.S. Cl. .................. 210/170; 210/315; 210/316; 210/323.2; 210/338; 210/435; 210/460; 210/489; 210/499

[58] Field of Search ................... 210/170, 314, 210/315, 316, 323.2, 338, 342, 435, 460, 489, 492, 497.01, 499, 500.1

[56] References Cited

U.S. PATENT DOCUMENTS

| | | |
|---|---|---|
| 304,318 | 9/1884 | Hean . |
| 344,813 | 7/1886 | Bull et al. . |
| 616,364 | 12/1898 | Shreeve . |
| 1,026,612 | 5/1912 | Smith . |
| 1,585,409 | 5/1926 | Mayers . |
| 2,024,646 | 12/1935 | Jones . |
| 2,300,952 | 11/1942 | May . |
| 3,722,686 | 3/1973 | Arnett et al. . |
| 4,259,097 | 3/1981 | Patel et al. . |
| 4,550,778 | 11/1985 | Sullivan et al. ................... 210/499 |
| 4,579,665 | 4/1986 | Davis et al. . |
| 4,816,163 | 3/1989 | Lyons et al. . |
| 4,857,163 | 8/1989 | Lyons et al. . |
| 4,906,385 | 3/1990 | Lyons et al. . |
| 4,970,239 | 1/1990 | Whitekettie et al. . |
| 5,008,075 | 4/1991 | Rufolo . |
| 5,011,615 | 4/1991 | Minderman . |
| 5,015,395 | 5/1991 | Muia et al. . |
| 5,040,487 | 8/1991 | Bollyy et al. . |
| 5,062,967 | 11/1991 | Muia et al. . |
| 5,069,722 | 12/1991 | Murphy . |

FOREIGN PATENT DOCUMENTS

| | | | |
|---|---|---|---|
| 585301 | 2/1947 | United Kingdom ................... | 210/170 |

OTHER PUBLICATIONS

Federal Legislative Update, Sea Grant Program—New York State Non–Indigenous Aquatic Nuisance Prevention and Control, pp. 1–3.

Sea Grant, Dreissena Polymorpha: An Unwelcome New Great Lakes Invader, Charles R. O'Neill, Jr, Date: Nov. 1989, Revised: Feb. 1990.

Water Ways, NY Waterfront News, vol. 2, No: 10, Nov./Dec. 1991 pp. 4–6.

Great Lakes Sea Grant Nework, Zebra Mussels: A 1991 Great Lakes Overview, pp. 1–8.

Second International Zebra Mussel Research Conference, Conferene Proceedings, Nov. 1991, pp. 1–51.

Dreissena Polymorpha Information Review, Ny State Sea Grant Ext NY Zebra Mussel Inform. Clearinghouse, vol. 1, No:1, Sep./Oct. 1990.

Dreissena Polymorpha Information Review, NY State Sea Grant Ext NY Zebra Mussel Inform. Clearinghouse, vol. 1, No:2, Dec. 1990.

Dreissena Polymorpha Informtion Review, NY State Sea Grant Ext NY Zebra Mussel Inform. Clearinghouse, vol. 2, No: 1, Jan./Feb. 1991.

(List continued on next page.)

Primary Examiner—Neil McCarthy
Attorney, Agent, or Firm—Barnard, Brown & Michaels

[57] ABSTRACT

Disclosed herein are improvements to a water filtration system on a water intake line that prevent the infestation of Zebra Mussels in the water system. The water filtration system filters any water entering the water intake line through a filter having a largest pore size that is small enough to prevent the passage of an eggs or veliger of Zebra Mussels. To prevent accumulation of Zebra Mussels on the filters and the filtration unit, copper screens surround the filters and the water intake to the filtration system. The filters are also provided with threaded ends to facilitate easy and reliable removal and replacement of the filters when needed.

5 Claims, 3 Drawing Sheets

OTHER PUBLICATIONS

Dreissena Polmorpha Information Review, NY State Sea Grant Ext NY Zebra Mussel Inform. Clearinghouse, vol. 2, No:2, Mar./Apr. 1991, pp. 1–12.

Dreissena Polymorpha Information Review, NY State Sea Grant Ext NY Zebra Mussel Inform. Clearinghouse, vol. 2, No:3, May/Jun. 1991, pp. 1–12.

Dreissena Polymorpha Information Review, NY State Sea Grant Ext NY Zebra Mussel Inform. Clearinghouse, vol. 2, No:4, Jul./Aug. 1991; pp. 1–12.

Dreissena Polymorpha Information Review, NY State Sea Grant Ext NY Zebra Mussel Inform. Clearinghouse, vol. 2, No:5, Sep./Oct. 1991; pp. 1–12.

Dreissena Polymorpha Information Review, NY State Sea Grant Ext NY Zebra Mussel Inform. Clearinghouse, vol. 2, No:6, Nov./Dec. 1991; pp. 1–12.

WATER FILTRATION SYSTEM FOR CONTROL OF THE ZEBRA MUSSEL

FIELD OF THE INVENTION

The present invention relates to water filtration systems and more particularly relates to a water filtration system for controlling the spread of the Zebra Mussel into a water system having a water intake line extending into an aquatic environment exposed to Zebra Mussels.

BACKGROUND OF THE INVENTION

The spread of the Zebra Mussel into local waterways has created a great deal of concern. Some have attempted to solve the problem of control of Zebra Mussels by adding toxic compounds to the water or by mechanically removing the mussels after they have attached to the water lines. Recently, residential filtration systems have been sold to control mussel infestation. These filters have a pore size of 40 microns or less to keep the veligers out of the main system in the house.

While the filters keep the zebra mussels out of the house, the filtration units must be checked regularly to prevent zebra mussels from building up on the filters or in the unit itself. The filters are currently attached to the system by a slip sleeve connection. The filters are pulled from the unit and cleaned in bleach to kill any zebra mussels, eggs or veligers mid reinstalled in the unit. To perform this maintenance, the unit must be pulled from the water or divers must work on the unit in place. In either case, the slip sleeve connection has been a point of concern when reassembling the units. It is hidden from view once the unit is installed. When the filters are replaced in the unit it is difficult to tell if an adequate seal has been established or if there is a gap in the slip sleeve connection the filtration system will be compromised.

The maintenance of the filtration system is usually performed at least once a year for houses in use only a part of the year and more often for houses in use all year. The expense of this maintenance is much less costly than replacing the plumbing lines in the house so the filtration units and maintenance are justified by the protection they provide, but are still a significant expense.

SUMMARY OF THE INVENTION

The teachings of the present invention include the discovery that a water filtration system on a water intake line can be improved to prevent the infestation of Zebra Mussels on or around the water filtration system. It was previously known that copper is toxic to zebra mussels. The inventors have improved the previously available water filtration systems by placing copper screens around the filters within the unit and by providing a threaded end on the filters such that the problems of the slip on sleeve connection are avoided. These improvements allow maintenance to be performed less frequently and more quickly and reliably.

These and other objects, features and advantages of the present invention should become apparent from the following description when taken in conjunction with the accompanying drawings.

DETAILED DESCRIPTION OF THE PREFERRED EMBODIMENT

The teachings of the present invention include improvements to a water filtration system for controlling the spread of the Zebra Mussel into a water system having a water intake line extending into an aquatic environment exposed to Zebra Mussels. As used herein, the term "aquatic environment" broadly encompasses any lake, streams, rivers, ponds, pools, and any other collection of water that is capable of being invaded by Zebra Mussels, such as aquariums, shore wells, beach wells or water surrounding an intake line. As used herein, the term "water system for a dwelling unit" is used to describe the broad category of light use water systems which are particularly amenable to the benefits of water filtration systems for the intake line.

Figure 1:
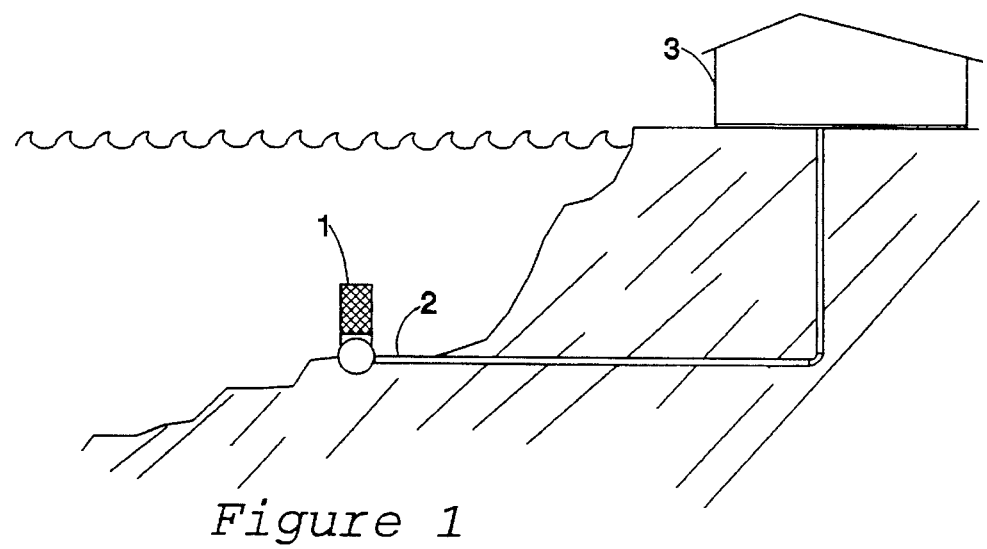
FIG. 1 is a side view of a water filtration system of the present invention connected to an intake line for a water system for a residential dwelling.
Figure 2:
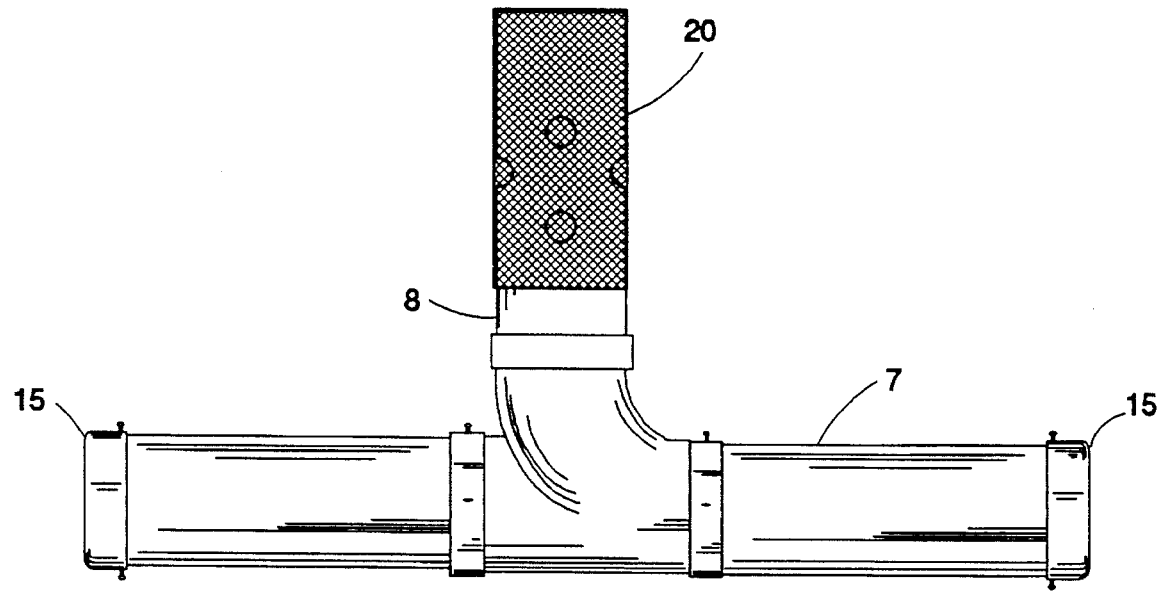
FIG. 2 is a side view of one embodiment of a water filtration system of the present invention With two filters positioned horizontally.
Figure 3:
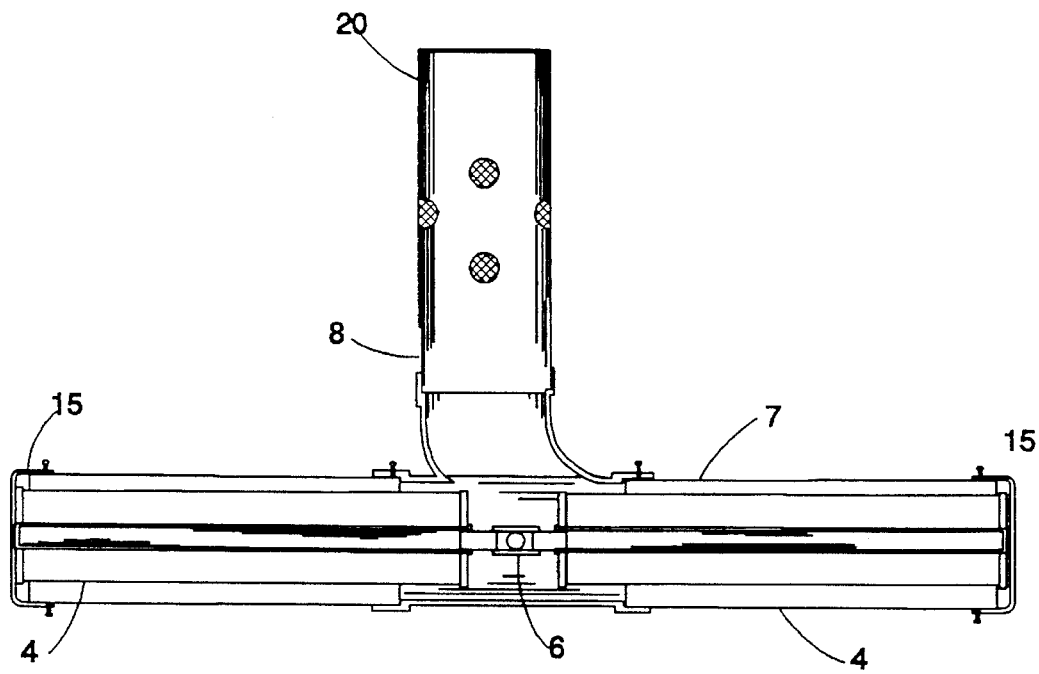
FIG. 3 is a cross section of one embodiment of a water filtration system of the present invention with two filters positioned horizontally.
Figure 4:
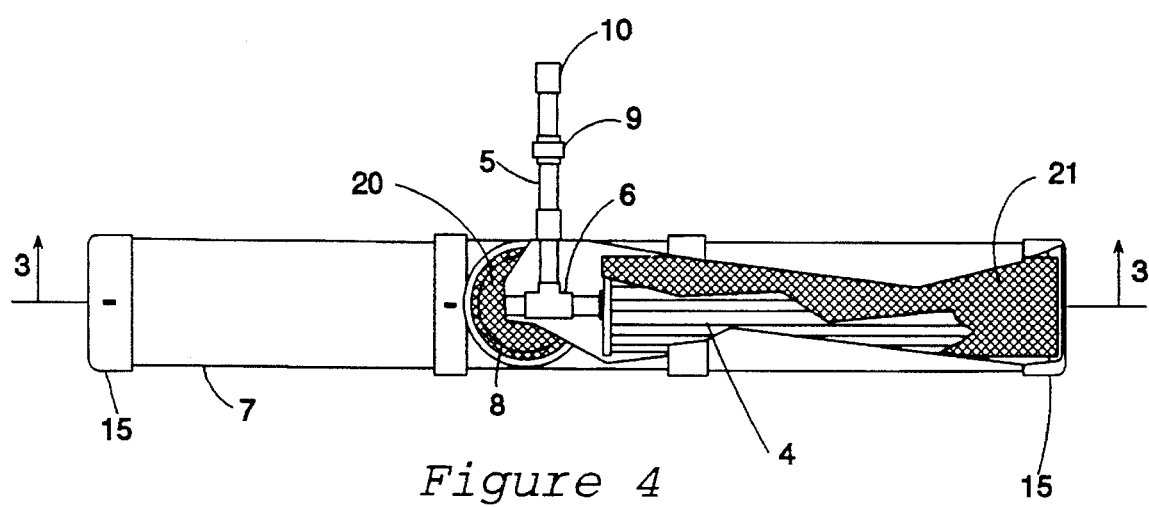
FIG. 4 is cut away top view of one embodiment of a water filtration system of the present invention with two filters positioned horizontally.

FIG. 1 is a side view of a water filtration system 1 of the present invention connected to an intake line 2 for a water system for a residential dwelling 3. FIG. 2 is a side view of one embodiment of a water filtration system 1 of the present invention with two filters 4 positioned horizontally. FIGS. 3 and 4 are a cross sectional view and a cut away top view of same embodiment of a water filtration system 1 of the present invention with two filters 4 positioned horizontally. The filtration system comprises: 1) an intake line connection 5, 2) water collection lines 6, 3) water filters 4 and 4) a housing 7 with a filter intake 8. The intake line connection 5 is for connecting the filtration system 1 to the intake line 2. The water collection line 6 extends from the intake line connection 5 for collecting water to pass through the intake line connection 5 and into the intake line 2. The water filter 4 has a largest pore size that is small enough to prevent passage of an egg or veliger of Zebra Mussels and is operatively associated with each of the collection lines 6 such that any water passing through the collection lines 6 must pass through the filter 4 and into the collection line. The housing 7 surrounds the filters 4 and includes a filter intake 8 such that any water entering the housing 7 and passing through the filters 4 enters through the filter intake 8. The filters 4 are of sufficient surface area and the collection lines 6 have sufficient openings to draw water through the water filtration system 1 effectively under normal operation of the water system.

The point at which the intake line connection 5 ends and the water collection lines 6 begin is not structural distinction, but rather a functional one. The intake line connection 5 may enter the housing 7 through a hole which is sealed, to prevent any silt from entering when the system sits on the bottom. The collection of water takes place inside of the housing, so the tubing inside of the housing is appropriately called the collection lines 6. It is anticipated within the teachings of the present invention, that various modifications of the housing 7, intake line connection 5, or collection lines 6 could be made to combine structurally these elements, however, ultimately the filtration system 1 of the present invention must connect to the intake line 2, collect water through the filter 4 and include some housing 7. The intake line connection 5 and the collection lines 6 could be constructed from 1¼" galvanized pipe, but many different shapes, sizes and materials could be used.

The water filtration system 1 usually rests on the bottom of the aquatic environment such that the filter intake 8 extends at least one and a half feet above the bottom of the aquatic environment. In situations where the filtration system 1 is used in shore wells or beach wells the filter intake 8 may be small because excess silt would not be a significant problem. The housing 7 can be shaped and positioned to minimize the disturbing effects of an currents in the aquatic environment. By positioning the filters 4 in a horizontal position the bulk of the filtration system 1 is on the bottom and therefore is less likely to be disturbed by currents.

The intake line connection 5 can be connected and disconnected from the intake line 2 through a union 9 such that the water filtration system 1 can be periodically serviced. The intake line connection 5 can include a valve 10 attached to the intake line 2 such that when the filtration system is disconnected from the intake line 2 water from the aquatic environment can be prevented from flowing into the intake line 2. While many types of valves 10 could be used, the check valve usually present (or easily added) on most water systems will adequately prevent inflow of unfiltered water as long as the system is properly shut down. One must be careful to either turn off the pump for the system or the system may draw in water while being serviced. If the back flush pressure is not strong enough to close a check valve, or the user does not want a check valve on the end of the intake line, a shut-off valve could be used instead.

The filtration system 1 of the present invention needs to be serviced periodically. Divers can easily access most water intake lines 2 for both initial installation and service. The entire filtration system 1 can be removed for Service, a replacement system connected in its place, or the filters 4 can be replaced and the filtration system 1 can be cleaned while still connected to the intake line. Replacing the system minimizes the time that the pump for the water system needs to be off and allows the divers servicing the filtration system 1 to make only one trip to the bottom. In either case, the inside of the filtration system 1 is cleaned of silt and the filters 4 are replaced with clean filters 4. The filters 4 can be cleaned and sterilized by rinsing the filters 4 in bleach.

Previously, it was necessary to clean any Zebra Mussel formations off of the system by known chemical treatments or mechanically either on the diver's boat or back at a service center. The filtration system 1 needs servicing about once to twice a year depending upon usage, environmental conditions and the size of the filtration system 1 installed. The addition of copper screens 20 around the filters 4 reduces the need to service the system 1. The copper is toxic to the veligers and the use of the screens keeps the zebra mussels from growing on the filters 4. A copper screen 21 is also used over the filter intake 8 to keep mussels from blocking the intake to the filtration system 1. The screen 21 on the filter intake 8 of the housing 7 also prevents larger organisms and debris from fouling the filtration system 1. In heavy silt environments, a series of screens could be employed to prevent more frequent servicing. The screens 21 are generally much cheaper than the filters 4 such that screens can be added liberally in hopes of elongating the life of the filters 4. The screen 21 is shown draped over the filter intake 8. This is to prevent dislodging of the whole unit if a fisherman's hook were to snag on the screen 21. For the same reason, the filter intake 8 could be loosely placed in the housing 7 such that if it were hit by an anchor or other object, the damage to the filtration system 1 would be minimal as the non-essential filter intake 8 extension would be knocked off before the entire filtration system 1 was disturbed.

The filters 4 shown should be at least 40 micron or less, as dictated by the current findings of the ability of eggs and veligers to pass through various pore sizes. A 20 micron filter has been used under experimental conditions, for quite some time without premature clogging. Filters of these pore sizes are currently available from various plumbing supply manufacturers such as Pleato Electric and Filter corporation, 113 Kean Street, West Babylon, N.Y. 11704. The filters 4 shown in FIGS. 3 and 4 are 100 square foot filters. This results in a total of 200 square feet of filter surface area for the whole filtration system 1. This has been more than adequate for residential dwellings.

Previously, the filters 4 were attached to the collection lines 6 by a slip sleeve connection. The filtration system of the present invention includes filters with threaded ends such that the filters 4 can be attached directly into a threaded T-connector. This eliminates extra parts for the collection lines (the slip-sleeve connector) and allows the filters 4 to be removed and replaced easily and without worry of an improper seal.

The filtration system's housing 7 can be constructed out of 6" PVC tubing as shown and end caps 15 are included. If these end caps 15 were removed either under water or back at a service center the filters 4 could be easily removed from the collection lines 6. While 6" PVC tubing is suggested for the embodiment shown, many different materials of various shapes and sizes could be used to implement the teachings of the present invention.

The filter intake 8 of the housing 7 can also be operatively associated with an outlet from a macro filtration unit which filters the water entering the filter intake 8 for larger particulates. The particulate filtration system would be for filtering larger particulates out with a cheaper and larger pore filters than the filters 4. Substantial savings could be accomplished by using even a 100 micron filter.

Many water systems use submersible pumps either in shore wells, beach wells or directly out in a lake. The intake line connection 5 can be connected to a housing for a submersible pump system such that the submersible pump is submerged entirely in water passing through the filtration system. The housing should always be large enough to allow enough filtered water to surround the pump to provide adequate cooling.

Figure 5:
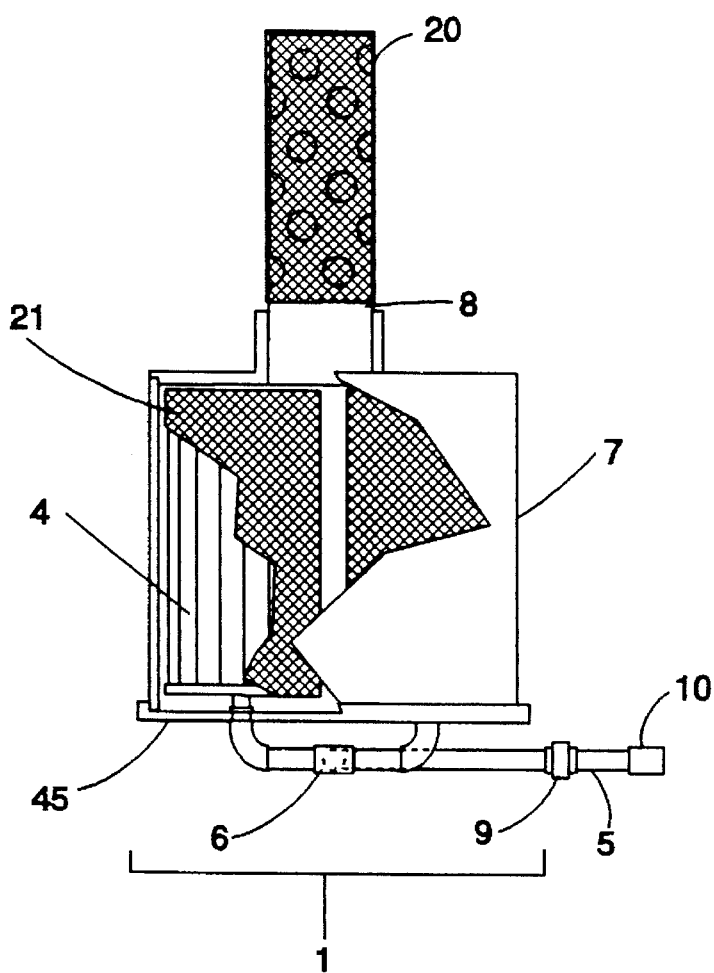
FIG. 5 is a cut away side view of one embodiment of a water filtration system of the present invention with four filters positioned vertically and a filter intake stack.

FIG. 5 is a cut away side views of one embodiment of a water filtration system 1 of the present invention with four filters 4 positioned vertically. The housing 7 can be constructed out of 18" PVC tubing and is easy to remove from the bottom seat 45. This facilitates easy cleaning without removing the entire filtration system 1. Furthermore, the filters 4 can be quickly and easily replaced. The collection lines 6 are predominately outside of the housing 7. The entire top portion of the housing 7 could be the filter intake 8 or a filter intake stack 8 could be employed as shown in FIG. 5.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

What is claimed is:

1. A water filtration system for preventing a Zebra Mussel from entering a water system having a water intake line extending into an aquatic environment exposed to Zebra Mussels, wherein said filtration system comprises:
    a) an intake line connection for connecting said filtration system to said intake line;
    b) at least one water collection line extending from said intake line connection;
    c) a water filter, having a largest pore size that is small enough to prevent passage of an egg or veliger of Zebra Mussels, operatively associated with each of said collection lines such that any water passing through said collection lines must pass through said filter and into said collection line;
    d) a copper screen surrounding said water filter; and
    e) a housing surrounding said filter and including a filter intake such that any water entering said housing and passing through said filters enters through said filter intake.

2. The water filtration system of claim 1 wherein said filter intake of said housing is operatively associated with an outlet from a macro filtration unit which filters said water entering said filter intake for particulates greater than 100 microns.

3. The water filtration system of claim 1 wherein said intake line includes a valve attached to said intake line such that when said filtration system is disconnected from said intake line water from said aquatic environment can be prevented from flowing into said intake line.

4. The water filtration system of claim 1 wherein said water filter has a threaded end for connection into a threaded receptacle to seal and connect said water filter to said collection line.

5. The water filtration system of claim 1 further comprising a copper screen covering said filter intake.

* * * * *